(12) United States Patent
Purushothaman et al.

(10) Patent No.: US 11,783,209 B2
(45) Date of Patent: Oct. 10, 2023

(54) ARTIFICIAL INTELLIGENCE BASED DYNAMIC ORCHESTRATION ENGINE FOR AUTOMATICALLY PROCESSING APPLICATION SERVICE REQUESTS

(71) Applicant: BANK OF AMERICA CORPORATION, Charlotte, NC (US)

(72) Inventors: Sasidhar Purushothaman, Telangana (IN); Vani Kodali, Telangana (IN); Ramadhar Singh, Telangana (IN); Pavan R. Talakanti, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 674 days.

(21) Appl. No.: 16/925,050

(22) Filed: Jul. 9, 2020

(65) Prior Publication Data

US 2022/0012605 A1    Jan. 13, 2022

(51) Int. Cl.
| | |
|---|---|
| *G06F 11/00* | (2006.01) |
| *G06N 5/04* | (2023.01) |
| *G06N 20/00* | (2019.01) |
| *G06N 5/01* | (2023.01) |
| *G06F 11/07* | (2006.01) |

(52) U.S. Cl.
CPC .......... *G06N 5/04* (2013.01); *G06F 11/0793* (2013.01); *G06N 5/01* (2023.01); *G06N 20/00* (2019.01)

(58) Field of Classification Search
CPC .................................................. G06F 11/0793
USPC ....................................................... 714/1–57
See application file for complete search history.

(56) References Cited

U.S. PATENT DOCUMENTS

| | | | | |
|---|---|---|---|---|
| 6,654,915 | B1* | 11/2003 | Lu .................. | G06F 11/0748 714/47.1 |
| 6,772,107 | B1* | 8/2004 | La Cascia, Jr. ..... | G06F 11/3495 703/22 |
| 7,055,063 | B2* | 5/2006 | Leymann ............ | G06F 11/1471 714/6.32 |
| 7,664,980 | B2* | 2/2010 | Kulkarni ............. | G06F 11/0709 709/224 |
| 8,966,318 | B1* | 2/2015 | Shah ................... | G06F 11/3664 714/28 |
| 9,449,330 | B2* | 9/2016 | Smith .................. | A63F 13/792 |
| 2004/0078691 | A1* | 4/2004 | Cirne .................. | G06F 11/3636 714/E11.207 |
| 2005/0039080 | A1* | 2/2005 | Wenzel ................ | G06F 9/468 714/E11.144 |

(Continued)

*Primary Examiner* — Sarai E Butler
(74) *Attorney, Agent, or Firm* — Moore & Van Allen PLLC; Nicholas C. Russell

(57) ABSTRACT

Embodiments of the present invention provide a system for dynamically processing application service requests. The system is configured for receives an application service request from at least one channel, where the application service request is associated with an application of one or more applications associated with an entity, extracts one or more variants of standard operating procedure associated with the application service request, wherein the one or more variants are solutions associated with processing the application service request, determines, via an artificial intelligence engine, an optimal variant from the one or more variants to process the application service request, and implements one or more actions associated with the optimal variant to process the application service request.

17 Claims, 6 Drawing Sheets

(56) References Cited

U.S. PATENT DOCUMENTS

| | | | | |
|---|---|---|---|---|
| 2014/0025354 A1* | 1/2014 | Padullaparthi | ......... | G06Q 10/00 |
| | | | | 703/2 |
| 2014/0068330 A1* | 3/2014 | Hecox | ................ | G06F 11/0706 |
| | | | | 714/E11.178 |
| 2016/0041882 A1* | 2/2016 | Kruse | ................ | G06F 11/0727 |
| | | | | 714/16 |
| 2019/0354991 A1* | 11/2019 | Sosale | .................. | G06Q 30/016 |
| 2020/0302343 A1* | 9/2020 | Gupta | .................. | G06F 18/214 |

* cited by examiner

ARTIFICIAL INTELLIGENCE BASED DYNAMIC ORCHESTRATION ENGINE FOR AUTOMATICALLY PROCESSING APPLICATION SERVICE REQUESTS

BACKGROUND

Conventional systems do not have the capability to dynamically process application service requests. As such, there exists a need for a system that dynamically processes application service requests associated with one or more applications of an entity.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically processing application service requests. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an application service request from at least one channel, where the application service request is associated with an application of one or more applications associated with an entity, extracts one or more variants of standard operating procedure associated with the application service request, wherein the one or more variants are solutions associated with processing the application service request, determines, via an artificial intelligence engine, an optimal variant from the one or more variants to process the application service request, and implements one or more actions associated with the optimal variant to process the application service request.

In some embodiments, the present invention determines the optimal variant from the one or more variants based on: identifying context of the application service request, identifying environment associated with the application service request, determining existing requests in a pipeline, extracting success rate associated with the one or more variants, applying logic to select the optimal variant from the one or more variants based on the context, performance of the environment, the existing requests, and the success rate associated with the one or more variants.

In some embodiments, the present invention in response to implementing the one or more actions associated with the optimal variant, determines that the one or more actions associated with the optimal variant are not successful in processing the application service request, gathers one or more errors associated with failure of processing the application service request, and stores the one or more errors in a heuristic datastore.

In some embodiments, the present invention receives a second application service request associated with the application, wherein the second application service request is similar to the application service request and determines a second optimal variant from the one or more variants excluding the optimal variant to process the second application service request.

In some embodiments, the present invention dynamically updates the one or more variants based on success rates associated with the one or more variants.

In some embodiments, the at least one channel is a monitoring tool.

In some embodiments, the at least one channel is a self-serve tool provided to one or more users of the entity, wherein the self-serve tool comprises a self-serve interface that allows the one or more users to submit self-serve application service requests.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
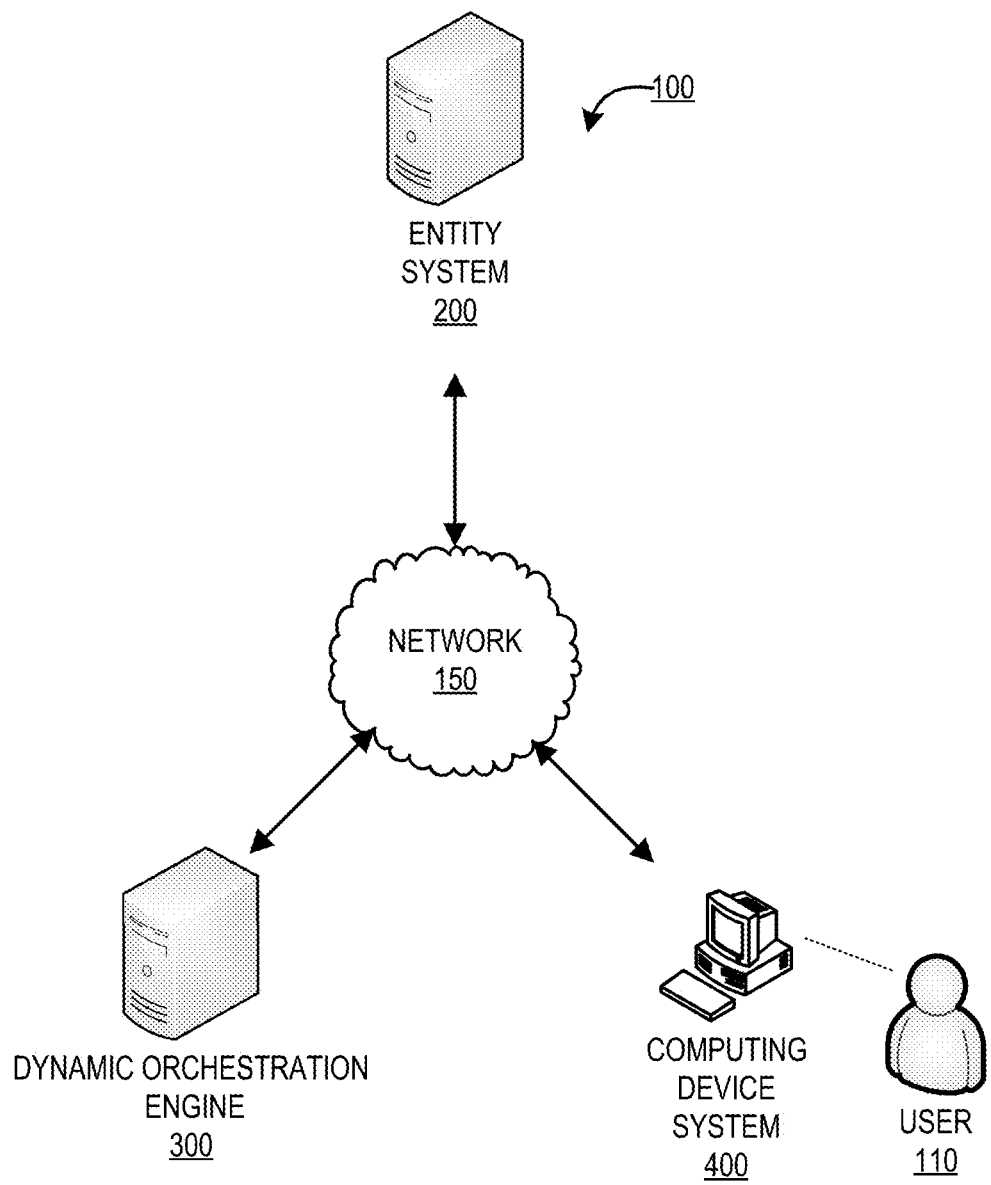
Figure 2:
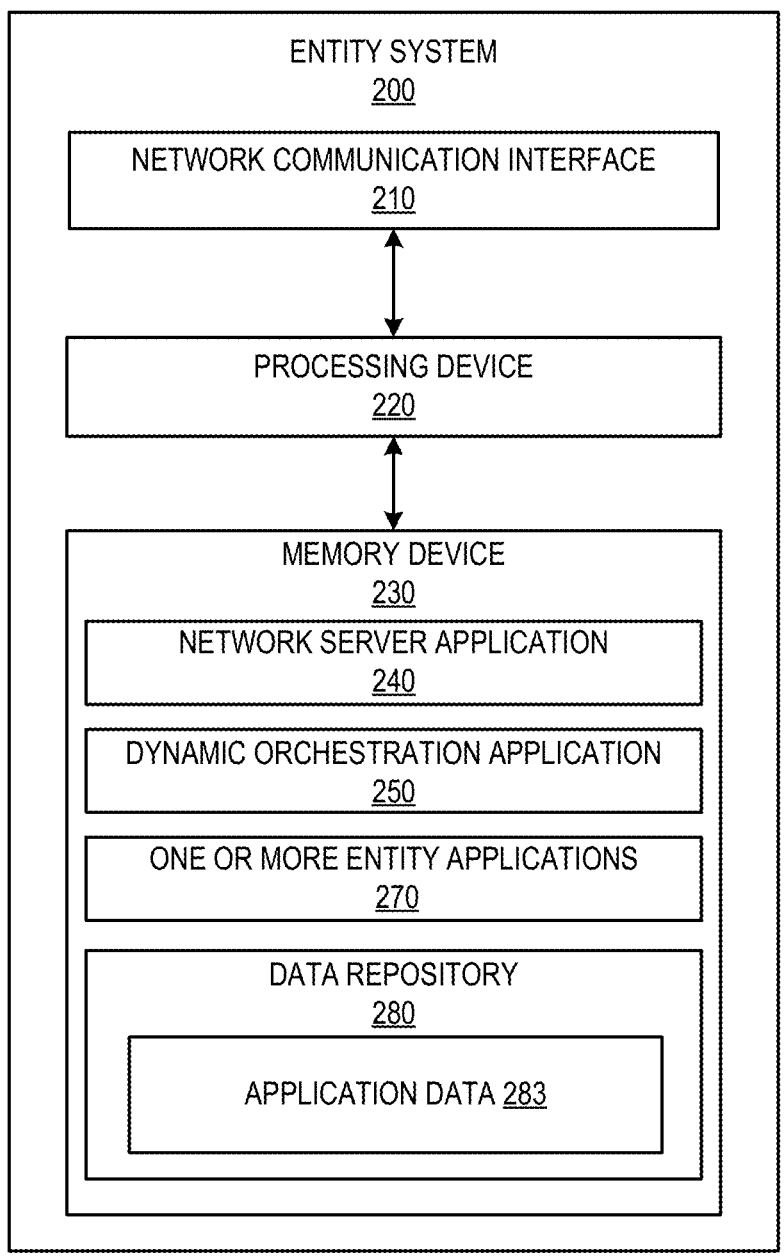
Figure 3:
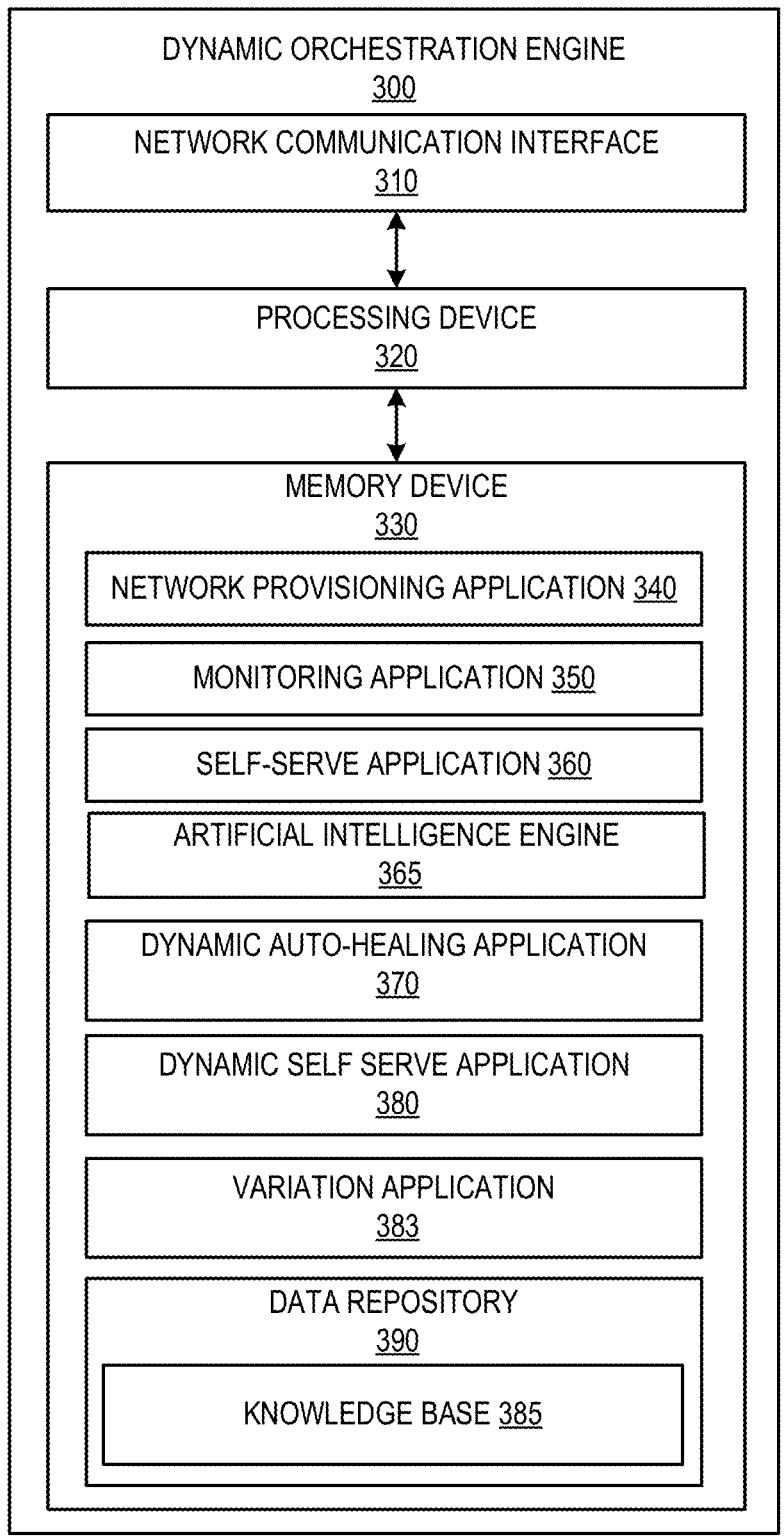
Figure 4:
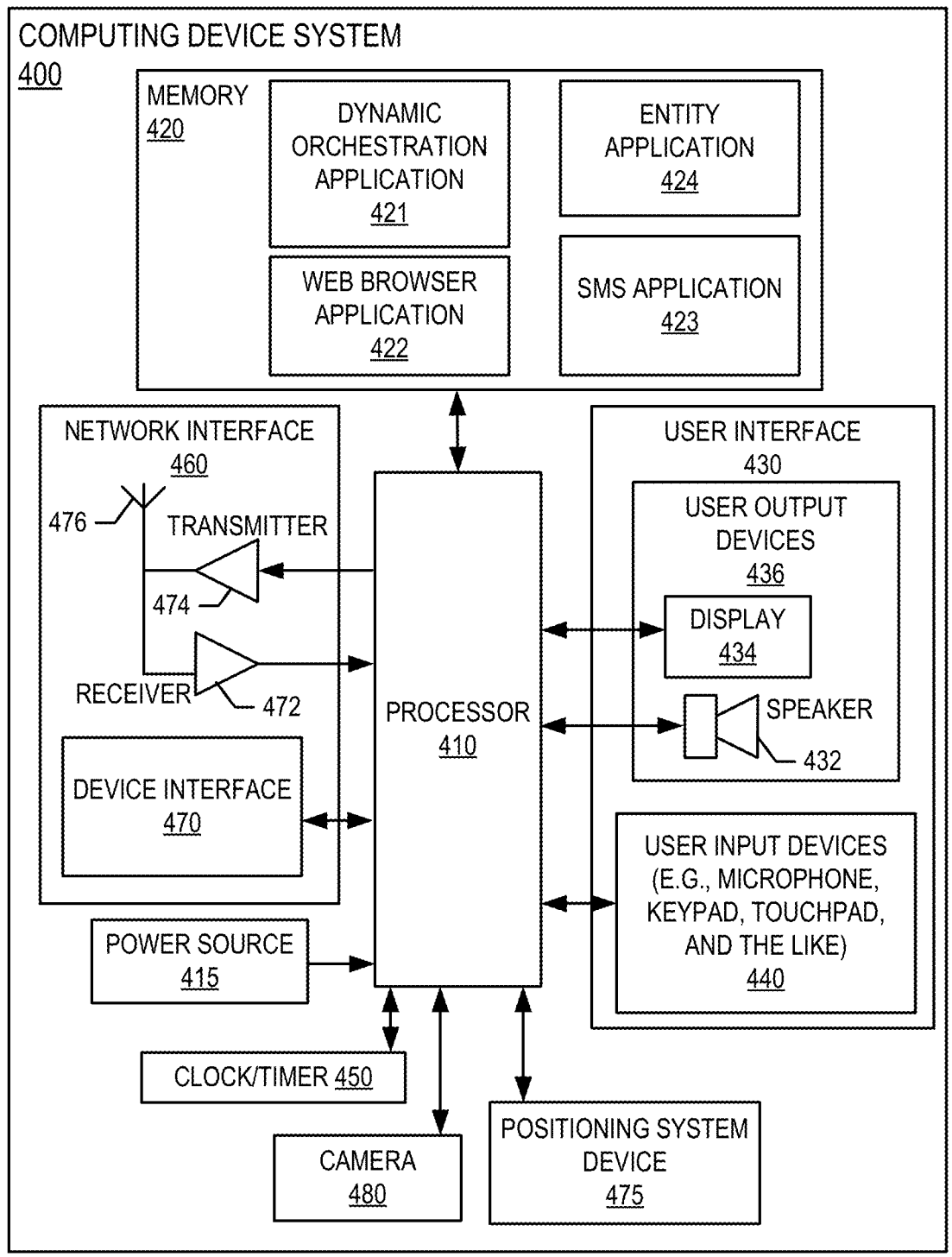
Figure 5:
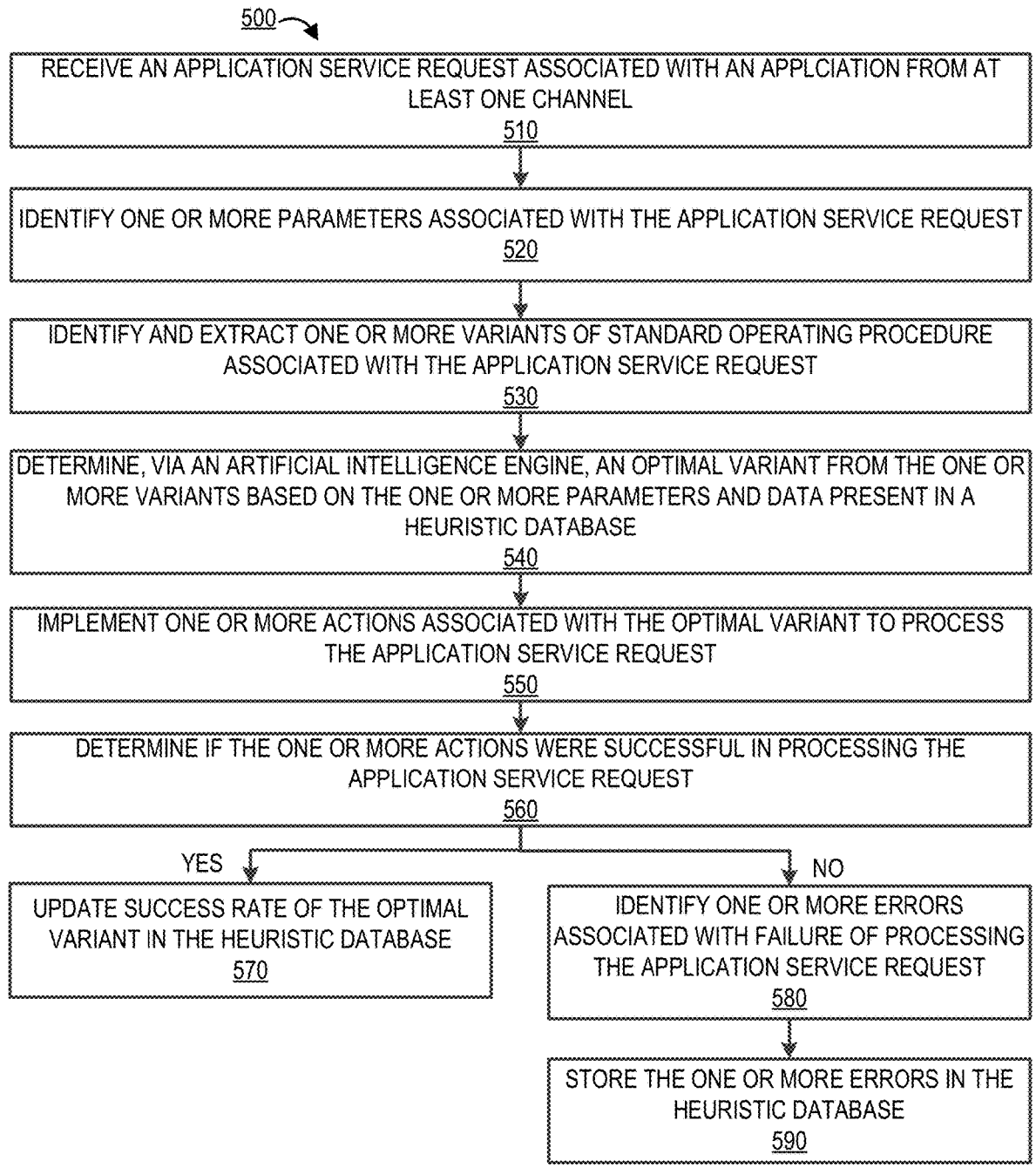
Figure 6:
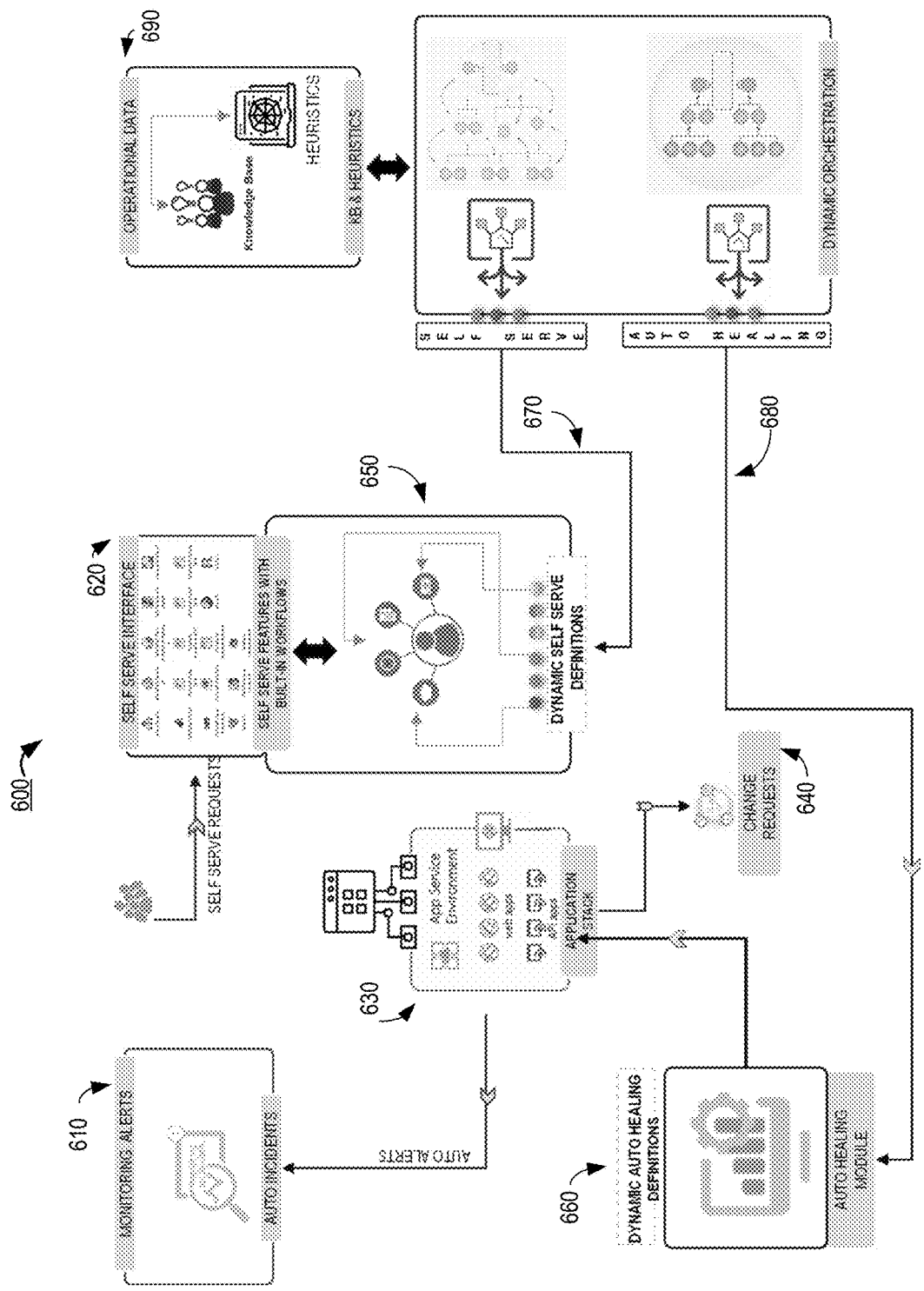

Having thus described embodiments of the invention in general terms, reference will now be made the accompanying drawings, wherein:

FIG. 1 provides a block diagram illustrating a system environment for dynamically processing application service requests, in accordance with an embodiment of the invention;

FIG. 2 provides a block diagram illustrating the entity system 200 of FIG. 1, in accordance with an embodiment of the invention;

FIG. 3 provides a block diagram illustrating a dynamic orchestration engine 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for dynamically processing application service requests, in accordance with an embodiment of the invention; and FIG. 6 provides a block diagram illustrating the process flow for dynamically processing application service requests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops, maintains, utilizes, and/or controls one or more applications. Applications as described herein may be any software applications configured to perform one or more operations of the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution. Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, errors or issues associated with one or more applications within the entity are directed to a help desk and when the help desk is supporting over hundreds of application, the time for resolving the issue can be abnormally long which in turn can lead to other issues or failures of other applications that depend on the applications that are having issues. Although some conventional systems have some automated features to resolve minor issues, these automated features are static and the conventional systems do not have the capability to dynamically resolve the issues in an efficient manner. The system of the present invention solves the aforementioned technical problem as described herein.

FIG. 1 provides a block diagram illustrating a system environment 100 for dynamically processing application service requests, in accordance with an embodiment of the invention. As illustrated in FIG. 1, the environment 100 includes a dynamic orchestration engine 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, application owners, application end users, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that develops, manages, operates, and/or controls one or more applications.

The dynamic orchestration engine 300 is a system of the present invention for performing one or more process steps described herein. In some embodiments, the dynamic orchestration engine 300 may be an independent system. In some embodiments, the dynamic orchestration engine 300 may be a part of the entity system 200.

The dynamic orchestration engine 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the dynamic orchestration engine 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the dynamic orchestration engine 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a dynamic orchestration application 250, one or more entity applications 270, and a data repository 280 comprising information associated with application data 283. The one or more entity application 270 are applications developed, supported, maintained, utilized, and/or controlled by the entity. Application data 283 may comprise environment data, historical failure data, and/or the like, and any other data associated with the one or more entity application 270. The computer-executable program code of the network server application 240, the dynamic orchestration application 250, the one or more entity application 270 to perform certain logic, data-extraction, and data-storing functions of the entity system 200 described herein, as well as communication functions of the entity system 200.

The network server application 240, the dynamic orchestration application 250, and the one or more entity applications 270 are configured to store data in the data repository 280 or to use the data stored in the data repository 280 when communicating through the network communication interface 210 with the dynamic orchestration engine 300, and/or the computing device system 400 to perform one or more process steps described herein. In some embodiments, the entity system 200 may receive instructions from the dynamic orchestration engine 300 via the dynamic orchestration application 250 to perform certain operations. The dynamic orchestration application 250 may be provided by the dynamic orchestration engine 300. The one or more entity applications 270 may be any of the applications used, created, modified, facilitated, and/or managed by the entity system 200.

FIG. 3 provides a block diagram illustrating the dynamic orchestration engine 300 in greater detail, in accordance with embodiments of the invention. As illustrated in FIG. 3, in one embodiment of the invention, the dynamic orchestration engine 300 includes one or more processing devices 320 operatively coupled to a network communication interface 310 and a memory device 330. In certain embodiments, the dynamic orchestration engine 300 is operated by an entity, such as a financial institution. In some embodiments, the dynamic orchestration engine 300 is owned or operated by the entity of the entity system 200. In some embodiments, the dynamic orchestration engine 300 may be an independent system. In alternate embodiments, the dynamic orchestration engine 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the dynamic orchestration engine 300 described herein. For example, in one embodiment of the dynamic orchestration engine 300, the memory device 330 includes, but is not limited to, a network provisioning application 340, a monitoring application 350, a self-serve application 360, an artificial intelligence engine 365, a dynamic auto healing application 370, a dynamic self-serve application 380, a variant application 383, and a data repository 390 comprising knowledge database 385 and any other data processed or accessed by one or more applications in the memory device 330. The computer-executable program code of the network provisioning application 340, the monitoring application 350, the self-serve application 360, the artificial intelligence engine 365, the dynamic auto healing application 370, the dynamic self-serve application 380, the variant application 383 may instruct the processing device 320 to perform certain logic, data-processing, and data-storing functions of the dynamic orchestration engine 300 described herein, as well as communication functions of the dynamic orchestration engine 300.

The network provisioning application 340, the monitoring application 350, the self-serve application 360, the artificial intelligence engine 365, the dynamic auto healing application 370, the dynamic self-serve application 380, the variant application 383 are configured to invoke or use the data in the data repository 390 when communicating through the network communication interface 310 with the entity system 200, and/or the computing device system 400. In some embodiments, the network provisioning application 340, the monitoring application 350, the self-serve application 360, the artificial intelligence engine 365, the dynamic auto healing application 370, the dynamic self-serve application 380, the variant application 383 may store the data extracted or received from the entity system 200, and the computing device system 400 in the data repository 390. In some embodiments, the network provisioning application 340, the monitoring application 350, the self-serve application 360, the artificial intelligence engine 365, the dynamic auto healing application 370, the dynamic self-serve application 380, the variant application 383 may be a part of a single application.

The monitoring application 350 monitors the one or more entity applications 270 associated with the entity. The monitoring application 350 may continuously monitor error logs of the one or more entity applications 270. The self-serve application 360 is an application provided by the dynamic orchestration engine which allows the one or more users 110 to report one or more application service requests (e.g., failures) to the dynamic orchestration engine 300. The dynamic orchestration engine may automatically provide dynamic solution and present the functionality (e.g., icon) associated with the dynamic solution on a self-serve interface, where the user may click the self-serve interface the functionality on the self-serve interface to resolve the application service request. The dynamic auto healing application 370 resolves the application service requests that are automatically identified by the dynamic orchestration engine 300 via the monitoring tool 350. The dynamic self-serve application 380 dynamically generates functionalities and presents the functionalities on the self-serve interface for the application service requests submitted by the one or more users 110 via the self-serve application provided by the system. The other functionalities and operations provided by the dynamic orchestration engine are explained in detail in FIG. 5 and FIG. 6.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a dynamic orchestration application 421, entity application 424. These applications also typically instructions to a graphical user interface (GUI) on the display 430 that allows the user 110 to interact with the entity system 200, the dynamic orchestration engine 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the dynamic orchestration application 421 provided by the dynamic orchestration engine 300 allows the user 110 to access the dynamic orchestration engine 300. In some embodiments, the entity application 424 provided by the entity system 200 and the dynamic orchestration application 421 allow the user 110 to access the functionalities provided by the dynamic orchestration engine 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow 500 for dynamically processing application service requests, in accordance with an embodiment of the invention.

As shown in block 510, the system receives an application service request associated with an application from at least one channel. In some embodiments, the application service request may be any request that is associated with failure of the application. In some embodiments, the application service request may be any technical support request that is associated with any feature provided by the application. The channel may be the self-service tool or the monitoring tool provided by the system. In some embodiments, the system may receive the application service request from a user of the one or more users 110 associated with the entity via the self-service interface provided by the system. In some embodiments, the system may receive the application service request from the monitoring tool/module of the system. In such embodiments, the monitoring tool provided by the system continuously monitors the application error logs of one or more applications to identify any errors associated with the applications.

As shown in block 520, the system identifies one or more parameters associated with the application service requests. The one or more parameters comprise at least one of environment associated with the application, context of the application service request, and existing application service requests associated with the application in a pipeline. The system identifies environment of the application which may include, but is not limited to, type of server that the application is hosted in (e.g., shared or independent), operating system associated with the server, network, CPU usage, memory usage, Random Access Memory (RAM), or the like. Context of the application service request defines a type of the application service request and criteria associated with the application service request. For example, the application service request may be associated with unresponsiveness of the application. In another example, the application service request may be associated with failure to store application data. The application service request may be associated with performance of the application, features that are supported by the applications, or the like. It should be understood that the examples described herein are for illustrative purposes only and in no way limit the scope of the invention. The application service requests may be complicated issues and application-specific issues than the examples described herein.

As shown in block 530, the system identifies and extracts one or more variants of standard operating procedure associated with the application service request. Standard operating procedures may be application specific and/or issue specific. Standard operating procedures may include one or more actions that can be performed to resolve the application service request. For example, to resolve an issue associated with an application, there may be at least six actions T1, T2, T3, T4, T5, and T6, where executing any one or combination of these five actions may resolve the issue. Standard operating procedure associated with the issue may be present in a datastore (e.g., knowledge base 385). In an exemplary embodiment, if the issue is failure of saving application data, the standard operating procedure with such an issue may include action T1 which comprises clearing of one or more logs, an action T2 which comprises clearing of cache, an action T3 which comprises truncate gathering of log data, an action T4 which comprises archiving the data, an action T5 which comprises transferring the archived data to a cloud system, an action T6 which comprises moving the archived data to secondary storage, or the like.

In some embodiments, the standard operating procedure may be generated by the system based on historical data. For example, the artificial intelligence engine may gather data associated with actions taken by a user to resolve multiple issues associated with multiple applications for a period of time and may generate the standard operating procedure using the gathered data. In some embodiments, the standard operating procedure may be received from a user.

One or more variants may be variants of sequence of steps that are performed to resolve the application service request. Continuing with the previous example, a first variant of the one or more variants may comprise executing T1, T3, and T5, a second variant may comprise executing T2 and T4, and the like. In some embodiments, the one or more variants are generated by the system of the present invention. Generation of the one or more variants may be based on historical data and/or success rate of one or more steps in resolving the issue. In some embodiments, the different variants may be generated for different types of issues and different types of contexts. In some embodiments, the system generates the one or more variants dynamically based on the one or more parameters and the data present in the heuristic database.

As shown in block 540, the system determines, via an artificial intelligence engine, an optimal variant from the one or more variants based on the one or more parameters and data present in a heuristic database. The data present in the heuristic database (e.g., knowledge base 385) comprises information associated with success rate of each of the one or more variants and/or each of the one or more actions/steps associated with resolving the application service request. In some embodiments, determination of the optimal variant may also be based on user preferences and/or application preferences (set by an application owner). Continuing with the previous example, if the issue is failure of saving application data of an application, the system may identify that the context of the issue requires clearing at least 1 gigabyte (GB) data, may identify the environment of the application, and may further identify if there are any existing issues within the pipeline that are associated with the application. In the case where there is an issue associated with the same application in the pipeline which will result in archiving a certain portion of data (Action T4), the system may choose a variant of sequence that does not include the action of archiving data (e.g., the system may choose a variant that comprises actions T1 and T2). In some embodiments, the system also considers environment performance while selecting the optimal variant. For example, if execution of action T5 results in degradation of environment performance, the system may not select a variant with action T5 unless it is necessary. In some embodiments, the system may consider environment of the server associated with the application. For example, if the server comprises a secondary storage, the system may choose a sequence comprising action T6 of moving the data to secondary storage depending on the context of the issue (e.g., size required to store the application data). In the case where success rate of a first variant is higher than other variants, the system may choose the first variant as the optimal variant. The artificial intelligence engine may use any combination of the examples described herein to dynamically select the optimal variant from the one or more variants. In some embodiments, where existing variants do not exist in the data store that are more suitable to the current application service request, the system dynamically generates a variant using any combination of the example described above.

As shown in block 550, the system implements one or more actions associated with the optimal variant to process the application service request. Continuing with the previous example, if the selected optimal variant comprises T1, T2, and T3, the system clears one or more logs, clears cache, and truncates gathering of log data.

As shown in block 560, the system determines if the one or more actions were successful in processing the application service request. If yes, the process flow moves onto block 570. As shown in block 570, the system updates success rate of the optimal variant in the heuristic database. For example, the system may increase the success rate of the optimal variant.

In the case where the system determines that the one or more actions were not successful in processing the application service request, the process flow moves to block 580 and block 590. As shown in block 580, the system identifies one or more errors associated with failure of processing the application service request. As shown in block 590, the system stores the one or more errors in the heuristic database. For example, the system may identify that the action T3 resulted in a failure of processing the application service request and may store this error data in the heuristic database. In some embodiments, in response to determining that the one or more actions were not successful in processing the application service request, the system dynamically selects another variant and implements one or more actions present in the variant.

The system may use the data present in the heuristic database to process future application service requests efficiently. Continuing with the previous example, in one exemplary embodiment, if the system receives another application service request similar to the previously processed application service request, the system avoids selecting a variant that comprises action T3. In some embodiments, the system may automatically update the one or more variants based on the data present in the heuristic database. For example, the system may determine that the success rate of action T3 is below a threshold and may automatically change the variants comprising the action T3 (e.g., remove action T3). The system of the present invention receives multiple application service requests associated with multiple applications and processes the multiple application service requests simultaneously in an efficient manner.

FIG. 6 provides a block diagram 600 illustrating the process flow for dynamically processing application service requests, in accordance with an embodiment of the invention. As shown, the system may receive application service requests from monitoring tool 350 based on monitoring alerts to automatically identify incidents as shown in block 610. In some cases the system may receive application service requests from the self-serve interface of the self-serve tool 360 as shown in block 620. In some cases, the application service requests may be change requests that may be submitted by application owners, where the changes may be associated with changing the environment of the application (e.g., changing a security related feature of the environment) as shown in block 640. The application service requests may be associated with one or more applications 270 represented as application stack in block 630. In response to receiving the application service requests, the dynamic orchestration engine 300, depending on the source of the incoming request may output a self-serve functionality 670 (self-serve definition) or auto healing functionality 680 (auto healing definition) based on the heuristic data and operation data present in the knowledge base 385 as represented in block 690. In some embodiments, the self-serve functionality is stored in the self-serve definition library as illustrated in block 650 and is presented to the user via the self-serve interface. The user may then click the self-serve functionality presented on the self-serve interface. In some embodiments, when the user clicks on the self-serve functionality, the self-serve functionality automatically triggers one or more actions to resolve the application service request. In some embodiments, the auto healing functionality 680 is transferred to the auto healing module as represented in block 660, where the auto healing module automatically implements the one or more actions present in the auto healing functionality 680 to resolve the application service request.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An artificial intelligence based system for dynamically processing application service requests, the system comprising:
   at least one network communication interface;
   at least one non-transitory storage device; and
   at least one processing device coupled to the at least one non-transitory storage device and the at least one network communication interface, wherein the at least one processing device is configured to:
      receive an application service request from at least one channel, where the application service request is associated with an application of one or more applications associated with an entity;
      extract one or more variants of standard operating procedure associated with the application service request, wherein the one or more variants are solutions associated with processing the application service request;
      determine, via an artificial intelligence engine, an optimal variant from the one or more variants to process the application service request, wherein determining the optimal variant from the one or more variants is based on:
      identifying context of the application service request;
      identifying environment associated with the application service request;
      determining existing requests in a pipeline;
      extracting success rate associated with the one or more variants;
      applying logic to select the optimal variant from the one or more variants based on the context, performance of the environment, the existing requests, and the success rate associated with the one or more variants; and
      implement one or more actions associated with the optimal variant to process the application service request.

2. The system of claim 1, wherein the at least one processing device is configured to:
   in response to implementing the one or more actions associated with the optimal variant, determine that the one or more actions associated with the optimal variant are not successful in processing the application service request;
   gather one or more errors associated with failure of processing the application service request;
   store the one or more errors in a heuristic datastore.

3. The system of claim 2, wherein the at least one processing device is configured to:
   receive a second application service request associated with the application, wherein the second application service request is similar to the application service request; and
   determine a second optimal variant from the one or more variants excluding the optimal variant to process the second application service request.

4. The system of claim 1, wherein the at least one processing device is configured to dynamically update the one or more variants based on success rates associated with the one or more variants.

5. The system of claim 1, wherein the at least one channel is a monitoring tool.

6. The system of claim 1, wherein the at least one channel is a self-serve tool provided to one or more users of the entity, wherein the self-serve tool comprises a self-serve interface that allows the one or more users to submit self-serve application service requests.

7. A computer program product for dynamically processing application service requests, the computer program product comprising a non-transitory computer-readable storage medium having computer executable instructions for causing a computer processor to perform the steps of:
- receiving an application service request from at least one channel, where the application service request is associated with an application of one or more applications associated with an entity;
- extracting one or more variants of standard operating procedure associated with the application service request, wherein the one or more variants are solutions associated with processing the application service request;
- determining, via an artificial intelligence engine, an optimal variant from the one or more variants to process the application service request, wherein determining the optimal variant from the one or more variants is based on:
  - identifying context of the application service request;
  - identifying environment associated with the application service request;
  - determining existing requests in a pipeline;
  - extracting success rate associated with the one or more variants;
  - applying logic to select the optimal variant from the one or more variants based on the context, performance of the environment, the existing requests, and the success rate associated with the one or more variants; and
- implementing one or more actions associated with the optimal variant to process the application service request.

8. The computer program product of claim 7, wherein the computer executable instructions cause the computer processor to perform the steps of:
- in response to implementing the one or more actions associated with the optimal variant, determining that the one or more actions associated with the optimal variant are not successful in processing the application service request;
- gathering one or more errors associated with failure of processing the application service request;
- storing the one or more errors in a heuristic datastore.

9. The computer program product of claim 8, wherein the computer executable instructions cause the computer processor to perform the steps of:
- receiving a second application service request associated with the application, wherein the second application service request is similar to the application service request; and
- determining a second optimal variant from the one or more variants excluding the optimal variant to process the second application service request.

10. The computer program product of claim 7, wherein the computer executable instructions cause the computer processor to perform the steps of dynamically updating the one or more variants based on success rates associated with the one or more variants.

11. The computer program product of claim 7, wherein the at least one channel is a monitoring tool.

12. The computer program product of claim 7, wherein at least one channel is a self-serve tool provided to one or more users of the entity, wherein the self-serve tool comprises a self-serve interface that allows the one or more users to submit self-serve application service requests.

13. A computer implemented method for dynamically processing application service requests, wherein the method comprises:
- receiving an application service request from at least one channel, where the application service request is associated with an application of one or more applications associated with an entity;
- extracting one or more variants of standard operating procedure associated with the application service request, wherein the one or more variants are solutions associated with processing the application service request;
- determining, via an artificial intelligence engine, an optimal variant from the one or more variants to process the application service request, wherein determining the optimal variant from the one or more variants is based on:
  - identifying context of the application service request;
  - identifying environment associated with the application service request;
  - determining existing requests in a pipeline;
  - extracting success rate associated with the one or more variants;
  - applying logic to select the optimal variant from the one or more variants based on the context, performance of the environment, the existing requests, and the success rate associated with the one or more variants; and
- implementing one or more actions associated with the optimal variant to process the application service request.

14. The computer implemented method of claim 13, wherein the method further comprises
- in response to implementing the one or more actions associated with the optimal variant, determining that the one or more actions associated with the optimal variant are not successful in processing the application service request;
- gathering one or more errors associated with failure of processing the application service request;
- storing the one or more errors in a heuristic datastore.

15. The computer implemented method of claim 14, wherein the method further comprises:
- receiving a second application service request associated with the application, wherein the second application service request is similar to the application service request; and
- determining a second optimal variant from the one or more variants excluding the optimal variant to process the second application service request.

16. The computer implemented method of claim 13, wherein the method further comprises dynamically updating the one or more variants based on success rates associated with the one or more variants.

17. The computer implemented method of claim 13, wherein the at least one channel is a monitoring tool.

* * * * *